US012389075B2

(12) United States Patent
Loughman et al.

(10) Patent No.: US 12,389,075 B2
(45) Date of Patent: Aug. 12, 2025

(54) AUTOMATIC MEDIA CONTROL BASED ON VIEWER ATTENTION

(71) Applicant: Rovi Product Corporation, San Jose, CA (US)

(72) Inventors: Enda Loughman, Galway (IE); Michael Buckley, Offaly (IE)

(73) Assignee: Rovi Product Corporation, San Jose, CA (US)

( * ) Notice: Subject to any disclaimer, the term of this patent is extended or adjusted under 35 U.S.C. 154(b) by 37 days.

(21) Appl. No.: 18/209,757

(22) Filed: Jun. 14, 2023

(65) Prior Publication Data

US 2024/0422396 A1    Dec. 19, 2024

(51) Int. Cl.
*H04N 21/472* (2011.01)
*G06T 7/20* (2017.01)
*G06V 20/52* (2022.01)
*G06V 40/16* (2022.01)

(52) U.S. Cl.
CPC ......... *H04N 21/47217* (2013.01); *G06T 7/20* (2013.01); *G06V 20/52* (2022.01); *G06V 40/172* (2022.01); *G06V 40/174* (2022.01); G06T 2207/10024 (2013.01); G06T 2207/10048 (2013.01); G06T 2207/30201 (2013.01); G06V 2201/07 (2022.01)

(58) Field of Classification Search
CPC .......... H04N 21/47217; G06V 40/174; G06V 20/52; G06V 40/172; G06T 7/20
See application file for complete search history.

(56) References Cited

U.S. PATENT DOCUMENTS

| 9,591,071 | B2* | 3/2017 | Goldstein | G06F 3/165 |
| 10,110,950 | B2* | 10/2018 | Abou Mahmoud | |
| | | | | H04N 21/8455 |
| 2014/0096152 | A1* | 4/2014 | Ferens | H04N 21/2668 |
| | | | | 725/12 |
| 2014/0098116 | A1* | 4/2014 | Baldwin | G06F 3/017 |
| | | | | 345/522 |
| 2019/0052926 | A1* | 2/2019 | Waterman | H04N 21/8455 |
| 2022/0312071 | A1* | 9/2022 | Devaraj | H04N 21/44218 |

\* cited by examiner

*Primary Examiner* — Mishawn N. Hunter
(74) *Attorney, Agent, or Firm* — Lerner David LLP (57) ABSTRACT

Generally disclosed herein is a system for automatically controlling media being viewed by a user based on the user attention levels predicted from gaze and drowsiness estimation and the user's position in a pre-marked monitoring zone. The system may be configured to adjust the monitoring zones based on varying lighting conditions, varying poses of the subjects or users, and the varying distances between the media devices and the users. The system may be further configured to automatically pause or play back the media content based on the user's attention level or changes in positions of the user.

20 Claims, 11 Drawing Sheets

AUTOMATIC MEDIA CONTROL BASED ON VIEWER ATTENTION

BACKGROUND

Viewers of media content, such as streaming content, may sometimes lose their concentration for a length of time while viewing the media. For example, a viewer may fall asleep, or the viewer may focus away from a display screen that is presenting the media. If the viewer misses out on key information about the media content, such as an important plot point in a story, the viewer may lose interest in the entire media content. The viewer may sometimes rewatch the content from a point prior to when they lost concentration, but it is difficult to accurately determine when the viewer first lost concentration and thus, from where the media content must replay.

BRIEF SUMMARY

Generally disclosed herein is a mechanism for enhanced hands-off control of a media device. The mechanism provides for automatically assessing one or more users in an environment based on attention level in relation to media content being played on the media device. It further provides for marking one or more monitoring zones in the environment to monitor only specific areas of the environment, and automatically tracking and updating the monitoring zones based on the positionings of the users. The mechanism further provides for automatically pausing or rewinding the media that the media device is playing based on the states of the users in the monitoring zones.

An aspect of the disclosure provides a system for automatic media control based on a user's attention level. The system includes one or more processors and memory in communication with the one or more processors, wherein the memory contains instructions configured to cause the one or more processors to detect a plurality of viewers of media content. The instructions are further configured to cause the one or more processors to determine a plurality of monitoring zones for the plurality of viewers. The instructions are further configured to cause the one or more processors to detect an activity within one ore more of the plurality of monitoring zones. The instructions are further configured to cause the one or more processors to determine, based on the detected activity within the one or more of the plurality of monitoring zones, an attention level of a respective viewer in the one or more of the plurality of monitoring zones. The instructions are further configured to cause the one or more processors to determine whether the attention level is below a preconfigured threshold attention level. The instructions are further configured to cause the one or more processors to mark the media content in response to the attention level being below the preconfigured threshold attention level, the marked media content representing a spot where the attention level drops below the preconfigured threshold attention level.

In another example, the instructions are further configured to cause the one or more processors to save facial recognition information for each of the plurality of viewers.

In yet another example, the monitoring zones are updated when at least one viewer moves from a first position to a second position.

In yet another example, the instructions are further configured to cause the one or more processors to determine a total number of viewers whose attention level is less than the preconfigured threshold attention level.

In yet another example, the instructions are further configured to cause the one or more processors to compare the total number of the viewers whose attention level exceeds the preconfigured threshold attention level with a preconfigured threshold number of users.

In yet another example, in response to the total number of the viewers whose attention level exceeding the preconfigured threshold attention level, the instructions are further configured to cause the one or more processors to display an option to remove a status of one or more of the viewers.

In yet another example, the instructions are further configured to cause the one or more processors to rewind the media content to a point where attention levels of one or more of the plurality of viewers were below a preconfigured threshold attention level.

In yet another example, the system includes a camera comprising a near-infrared (NIR) camera and a color (RGB) camera.

In yet another example, the camera automatically switches between the NIR and RGB cameras based on detecting brightness of a room where the plurality of viewers are viewing the media content.

In yet another example, the preconfigured threshold attention level is an individual preconfigured threshold attention level.

In yet another example, the preconfigured threshold attention level is a group preconfigured threshold attention level.

Another aspect of the disclosure provides a method for automatically controlling media based on a user's attention level. The method also includes detecting a plurality of viewers of media content. The method further includes determining a plurality of monitoring zones for the plurality of viewers. The method also includes detecting an activity within one or more of the plurality of monitoring zones. The method further includes determining, based on the detected activity within the one or more of the plurality of monitoring zones, an attention level of a respective viewer in the one or more of the plurality of monitoring zones. The method also includes determining whether the attention level is below a preconfigured threshold attention level. The method further includes marking the media content in response to the attention level being below the preconfigured threshold attention level, the marked media content representing a spot where the attention level drops below the preconfigured threshold attention level.

In another example, the method further includes comprising saving facial recognition information for each of the plurality of viewers.

In yet another example, the monitoring zones are updated when the at least one viewer moves from a first position to a second position.

In yet another example, the method further includes determining a total number of the plurality of viewers whose attention level is less than the preconfigured threshold attention level.

In yet another example, the method also includes comparing the total number of the plurality of viewers whose attention level exceeds the preconfigured threshold attention level with a preconfigured threshold number of users.

In yet another example, the method further includes in response to the total number of the plurality of viewers whose attention level exceeding the preconfigured threshold attention level, displaying an option to remove a status of one or more of the plurality of viewers.

In yet another example, the method also includes rewinding the media content to a point where attention levels of one or more of the plurality of viewers were below a preconfigured threshold attention level.

In yet another example, determining the viewers as viewing users of the media content utilizes a camera comprising a near-infrared (NIR) camera and a color (RGB) camera.

Another aspect of the disclosure provides for a non-transitory machine-readable medium comprising machine-readable instructions encoded thereon for performing a method of automatically controlling media based on a user's attention level. The method also includes detecting a plurality of viewers of media content. The method further includes determining a plurality of monitoring zones for the plurality of viewers. The method also includes detecting an activity within one or more of the plurality of monitoring zones. The method further includes determining, based on the detected activity within the one or more of the plurality of monitoring zones, an attention level of a respective viewer in the one or more of the plurality of monitoring zones. The method also includes determining whether the attention level is below a preconfigured threshold attention level. The method further includes marking the media content in response to the attention level being below the preconfigured threshold attention level, the marked media content representing a spot where the attention level drops below the preconfigured threshold attention level.

DETAILED DESCRIPTION

Generally disclosed herein is a system for automatically controlling media content being viewed by a user based on the user's attention levels. The user's attention levels may be predicted from the gaze and drowsiness estimation and changes in the user's position in a pre-marked monitoring zone. The system provides for configuring the monitoring zones based on varying lighting conditions, varying poses of the users, and distance between the media devices and the users. The system further provides for automatically marking a playback spot in the content when the user's attention level is detected to drop below a threshold, such that the content can be automatically rewound to the playback spot when the user's attention increases. Alternatively, or additionally, the system may provide for pausing or playing back the media content based on the user's attention level.

In some examples, the state of the users viewing media content may be monitored using one or more cameras built into a media device or a standalone camera that may process the gaze and drowsiness information of the users or an external camera connected to the media device.

In some examples, a camera attached to a media device may contain a near-infrared (NIR) component to allow the users to be detected in low-light conditions. For example, when the light of the room where the users are viewing the media content is relatively dark, the camera may be configured to perform consistently even in the case of flickering light being emitted from the media device.

In some examples, a monitoring system may be implemented to observe the users' gaze direction to ascertain the users' attention levels. For example, a user's gaze and eyelids may be continuously monitored. In some examples, the monitoring system may generate and display a warning sign when a user is losing focus on the media content.

In some examples, the system may automatically control the media content by fast-forwarding, rewinding, or pausing the media content. In some examples, gestures of the users may be used to determine the focus level of the users.

An automatic intervention may be triggered based on a triggering event. The triggering event may be when the user's attention is detected as falling below a threshold. For example, the triggering event may include a user falling asleep or looking elsewhere than at the media device. The automatic intervention may be an action taken by the system in response to the triggering event. For example, the action may be to mark a playback spot in the content, pause the content, provide a notification or prompt, etc. As one example, at the moment when the triggering event occurs, the system may automatically pause the program or mark the time with a one-click replay location. If the system determines that the user may have refocused back to the media device, the system may replay the media content automatically or provide the user with the one-click replay location.

In some examples, the system may implement safeguards to prevent the media content from continually starting or stopping. For example, the system may use a minimum threshold in which the user may need to be looking away or have the eyes closed. For example, such a threshold may be set to 5 seconds or less. If a user is looking away while talking to another user, the 5-second threshold may be long enough for the first user to make some comment to the second user without stopping the flow of the media content. On the other hand, a longer threshold may cause the users to lose their attention and understanding of the media content.

In another example, the system may differentiate the situation where a user is merely closing the eyes for increased concentration from the situation where the user is actually falling asleep. For example, the system may be capable of detecting a motion made by a user when the user is falling asleep and comparing the detected motion to another motion made by the user when the user closes their eyes to meditate or concentrate. In other examples, the system may be capable of receiving biometric information from a user utilizing a wearable device such as a smartwatch. The wearable device may send biometric information including the user's heart rate, body temperature, oxygen level, etc. For example, if the wearable device detects that the user's heart rate suddenly decreases, the system may determine that the user may have started falling asleep.

According to some examples, when multiple users are viewing a single media content in a single room, the system may continue to monitor each user. The system may apply the same threshold to each of the multiple users, but when one of the users starts falling asleep while other users continue to view the media content, the system may generate a message asking other users a question such as "user x is not engaged in the program would you like the monitoring zone on user x to be disabled?" If the other users press okay on a remote controller, user x who was falling asleep may be removed from the monitoring zone for the rest of the duration of the media content.

According to some examples, the system may monitor and count the occurrences of deviations in the gaze of the user from the media device. For example, the count may be counted as a distracted count and each occurrence when a specific user is recorded with their gaze moving away from the media device is captured. For each time, the distracted counter may be incremented. The system may set the maximum threshold of times that a user may be allowed to look away before the user may be removed from the monitoring zone. For instance, the default may be set to five times. The threshold may be configurable and may be changed by the users.

According to some examples, when there is more than one user viewing the same media content in the same room, a threshold may be set to determine the minimum number of users that need to be distracted to trigger the media content to pause or rewind. For example, if more than 50% of the users are not focused on the media content at a given time, the system may automatically control the media content to pause. If only two users are in the room and any one of the users is actively engaged in the media content, then the system may be configured to change the threshold to above or below 50% allowing the focused user to continue viewing the media content.

According to some examples, multiple users may be monitored using a facial recognition technique. All users may be automatically enrolled at the beginning of the media content. Once enrolled into the media content program, even if a user moves around the room, leaves, or re-enters the room, the system may identify and follow the particular user throughout the length of the media content being played.

According to some examples, the system may pre-mark the monitoring zones for each user. Each user may be assigned to a particular monitoring zone. During initial configuration, for example, different seating locations may be marked as monitoring zones. The system may keep track of individual counts of positioning changes in each monitoring zone.

According to some examples, the monitoring zones may be extended. The system may track and automatically update the monitoring zones based on the changes in the position of each user. For example, if a single user was initially located in a preconfigured monitoring zone and moves outside the assigned monitoring zone later, the system may modify or update the initially determined monitoring zone for that user. In some examples, if the user leaves outside the field of view of the camera attached to the media device, the system may stop monitoring the user's monitoring zone. In other examples, if the user remains in the field of view of the camera and does not enter one of the other pre-determined monitoring zones, the system may create a new monitoring zone based on the new location of the user if the user stays within the field of view of the camera for a certain length of time. The newly created monitoring zones may be added to the existing pre-determined monitoring zones. The monitoring zones may be stored in memory within the media device and retrieved when the users use other media content in the future. The new monitoring zone may only be added to the existing monitoring zones only for the duration of the current media content. Alternatively, the new monitoring zone may be added to the existing monitoring zones until a power cycle is carried out.

According to some examples, the system may determine a monitoring zone for a group of users. For example, in an open-plan living or dining area, a group of users may move from a sofa to a dining table and the system may define a general zone corresponding to the sofa area and dining area. If there are two users sitting on a sofa and viewing the media content and the users move to the dining area, the system may automatically update the monitoring zone to the dining area and allow the media device to continually display the media content without pause.

According to some examples, a poll of all users for a predefined time after media content starts playing may be collected to identify only those users' paying attention to the media content. The identified users may be monitored for the duration of the media content. During the time of polling, the system may be configured to forego pause/play/once-click replay functions.

According to some examples, the system may utilize both RGB/NIR cameras to obtain high-quality video capture of the users. The dual RGB/NIR cameras may adapt to environments where there are constant light changes. When the media content changes scenes, the level of brightness illuminating a room may constantly change. Using the NIR camera may allow the users to be captured accurately when the illumination level is low in the room. During the daytime, the RGB camera may be used to capture full-color frames. The camera may switch between the NIR and RGB modes automatically depending on the illumination level in the room. The system may configure a threshold of illumination level required for triggering the switching mechanism based on the distances from the camera to the users positioned in the monitoring zones.

According to some examples, the system may check for false positives and change preconfigured thresholds. The system may collect, and store datasets related to the users each time media content being viewed and may change the configuration of the thresholds based on the number of users in the room or varying room types.

According to some examples, determining of understanding or interest level of the users based on the monitoring zones may allow the generation of more accurate recommendations of similar media content in the future. For example, a better understanding of how much attention a user gives a particular media content may be factored in to provide more accurate recommendations next time. Also, the user's attentiveness level may be considered for an advertisement to be played. The system may detect the movement of the users while the advertisements are being played. Based on the user's attentiveness level, the advertisements may be paused, reduced in duration, or replayed. The measuring of the attentiveness level of the user may also be used as feedback in understanding the user's interest and adjusting the advertisement to be more narrowly tailored for the particular user in the future.

Figure 1A:
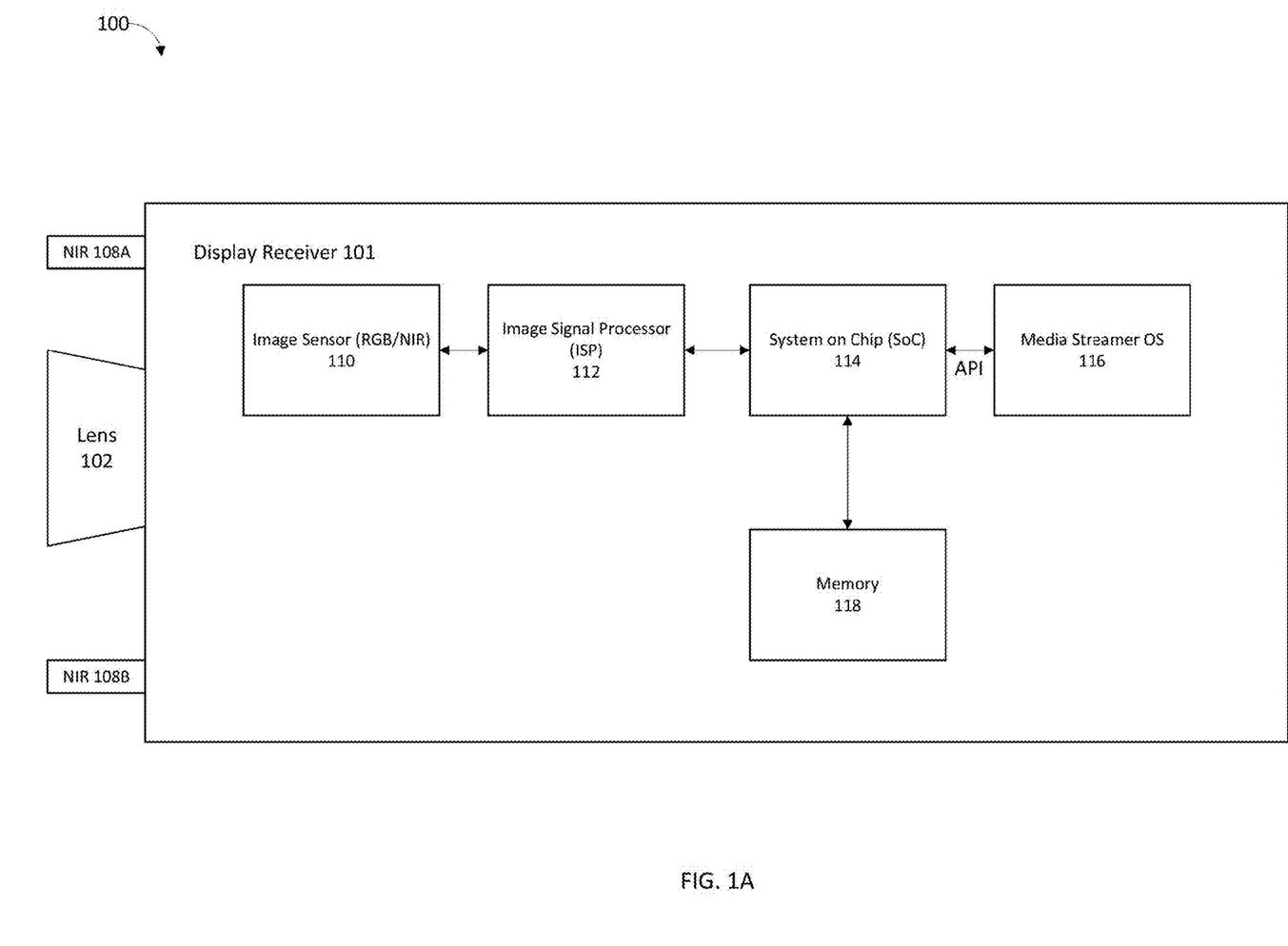
FIGS. 1A-1C are block diagrams depicting components of an example automatic media control system according to aspects of the disclosure.
Figure 1B:
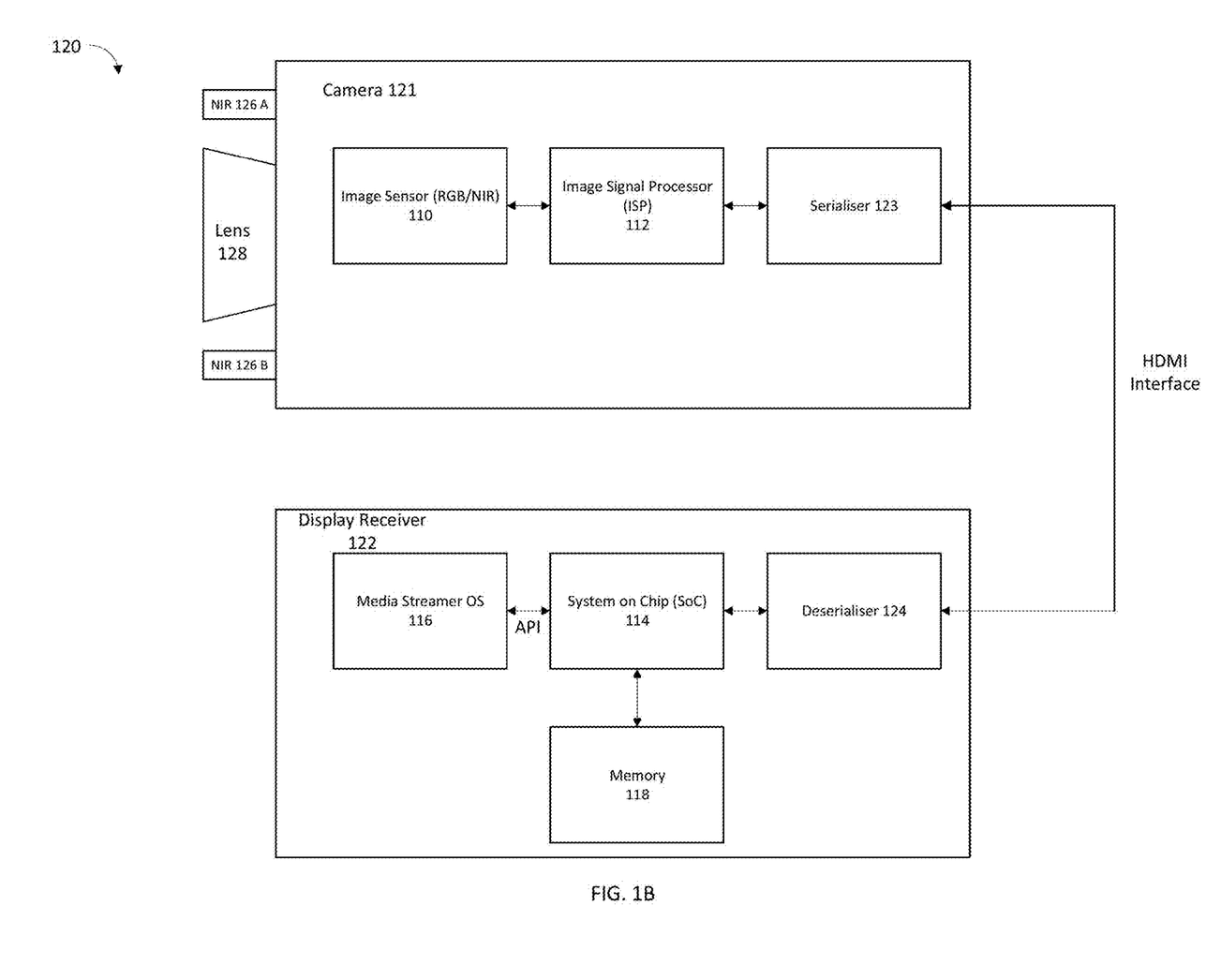
Figure 1C:
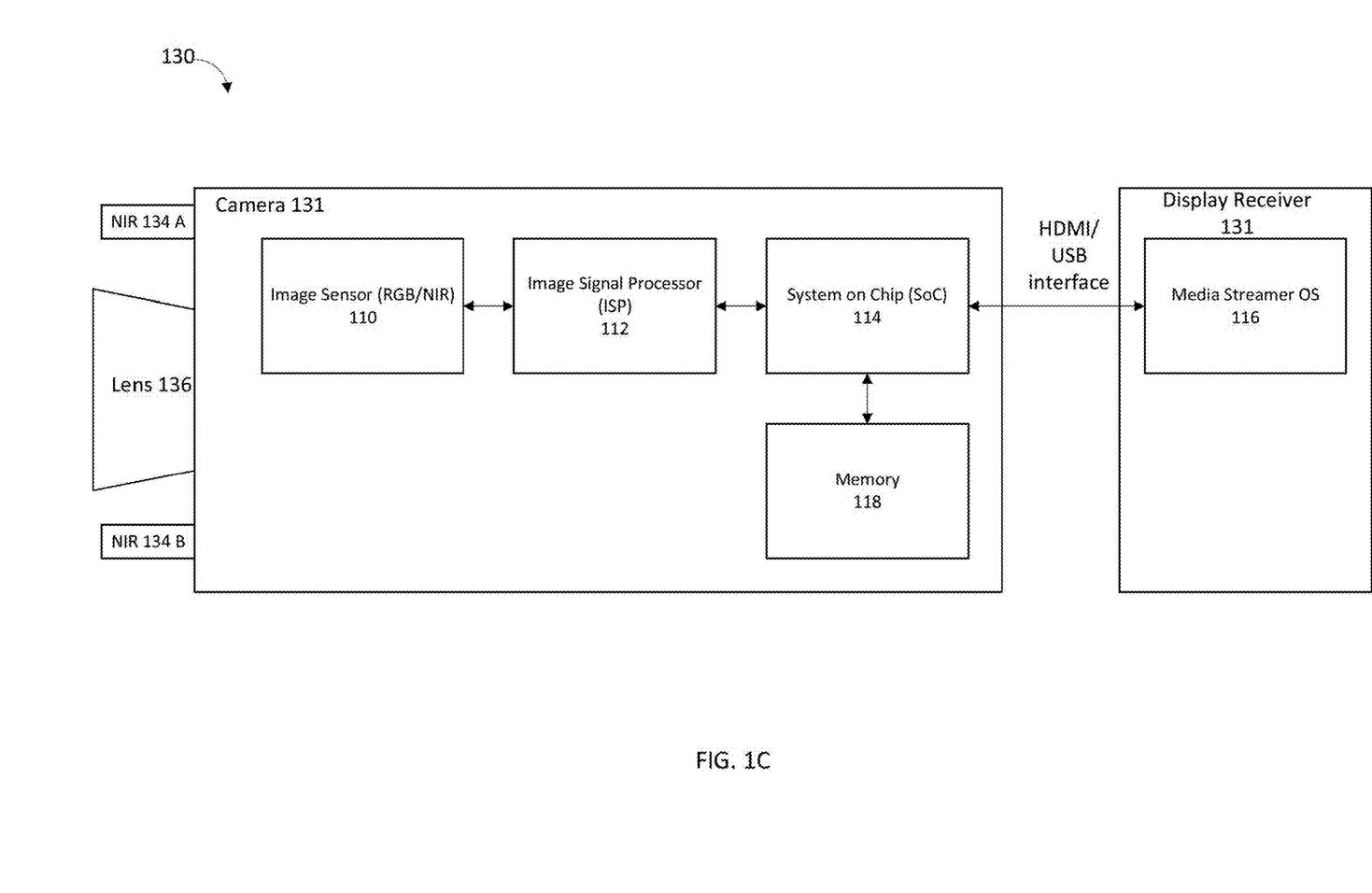

FIGS. 1A-C depict block diagrams of an example automatic media control systems. Referring to FIG. 1A, the automatic media control system 100 may include display receiver 101 comprising image sensor 110, image signal processor 112, system on chip 114, and media streamer OS 116. Display receiver 101 may also have near-infrared light emitter 108A-B and lens 102 connected to display receiver 101. Display receiver 101 may capture videos of multiple users using lens 102 as the users watch media content provided via media streamer OS 116. Display receiver 101 may utilize NIR 108A-B to emit near-infrared light when the room has insufficient illumination when capturing the videos of the users. Image sensor 110 may detect information from the captured images or videos via lens 102. Image sensor 110 may detect the images using visible light (RGB) or near-infrared light and convert the light to electrical signals. The converted light signals may be sent to an image signal processor (ISP) 112. ISP 112 may post-process the received image signals by demosaicing, denoising, and enhancing the received image signal. The post-processed image signals may be sent to system on chip (SoC) 114 for analysis. SoC 114 may comprise one or more processors, and memory storing data and instructions for implementing processes consistent with aspects of this disclosure. For example, SoC 114 may analyze each user's attentiveness based on the processed image signals. SoC 114 may store the data related to the user's attentiveness in memory 118. SoC 114 may interact with media streamer OS 116 via an application programming interface (API) such that SoC 114 may command media streamer OS 116 to pause or rewind the media content when one or more users lose focus on the media content.

Memory 118 can be a combination of volatile and non-volatile memory and can be at the same or different physical locations than the SoC 114. For example, memory 118 can include any type of non-transitory computer-readable medium capable of storing information, such as a hard drive, solid-state drive, tape drive, optical storage, memory card, ROM, RAM, DVD, CD-ROM, write-capable, and read-only memories. SoC 114 may include one or more processors including one or more central processing units (CPUs), graphic processing units (GPUs), field-programmable gate arrays (FPGAs), and/or application-specific integrated circuits (ASICs), such as tensor processing units (TPUs).

SoC 114 may include instructions that when executed by the processors, cause one or more processors to perform actions defined by the instructions. The instructions may be stored in object code format for direct processing by the processors, or in other formats including interpretable scripts or collections of independent source code modules that are interpreted on demand or compiled in advance. The instructions can include instructions for implementing processes consistent with aspects of this disclosure. SoC 114 may include data that can be retrieved, stored, or modified by the processors in accordance with the instructions. The data may include information related to user attention levels. The data can be stored in computer registers, in a relational or non-relational database as a table having a plurality of different fields and records, or as JSON, YML, proto, or XML documents. The data can also be formatted in a computer-readable format such as, but not limited to, binary values, ASCII, or Unicode. Moreover, the data can include information sufficient to identify relevant information, such as numbers, descriptive text, proprietary codes, pointers, references to data stored in other memories, including other network locations, or information that is used by a function to calculate relevant data.

Referring to FIG. 1B, a variation of the automatic media control system 120 is depicted. Display receiver 122 comprising media streamer OS 116, SoC 114, and memory 118 may be connected using deserializer 124 via a high-definition multimedia interface (HDMI) interface to camera 121. Camera 121 may comprise image sensor 110, image signal processor 112, and serializer 123. Camera 121 may capture images of the users using lens 128 and NIR 126A-B. The captured image information from the captured image may be detected using image sensor 110. ISP 112 may post-process the detected image information. The post-processed information may be serialized by serializer 123 to be transmitted to deserializer 124. The image information may be deserialized by deserializer 124 and processed by SoC 114. SoC 114 may send instructions to configure media streamer 116 to pause or rewind media content. The processed data may be stored in memory 118.

Referring to FIG. 1C, another variation of the automatic media control system 130 is depicted. Camera 131 may comprise image sensor 110, ISP 112, SoC 114, and memory 118. Display receiver 131 including media streamer OS 116 may interact with camera 131's SoC 114 via HDMI or USB interface. Camera 131 may capture images using lens 134 and NIR 134A-B. Images may be captured using lens 136 and NIR 134A-B and processed by images sensor 110, ISP 112, and SoC 114. SoC 114 may process the information and send instructions to media streamer OS 116 contained in display receiver 131 to pause or rewind the media content being watched by one or more users.

Figure 2A:
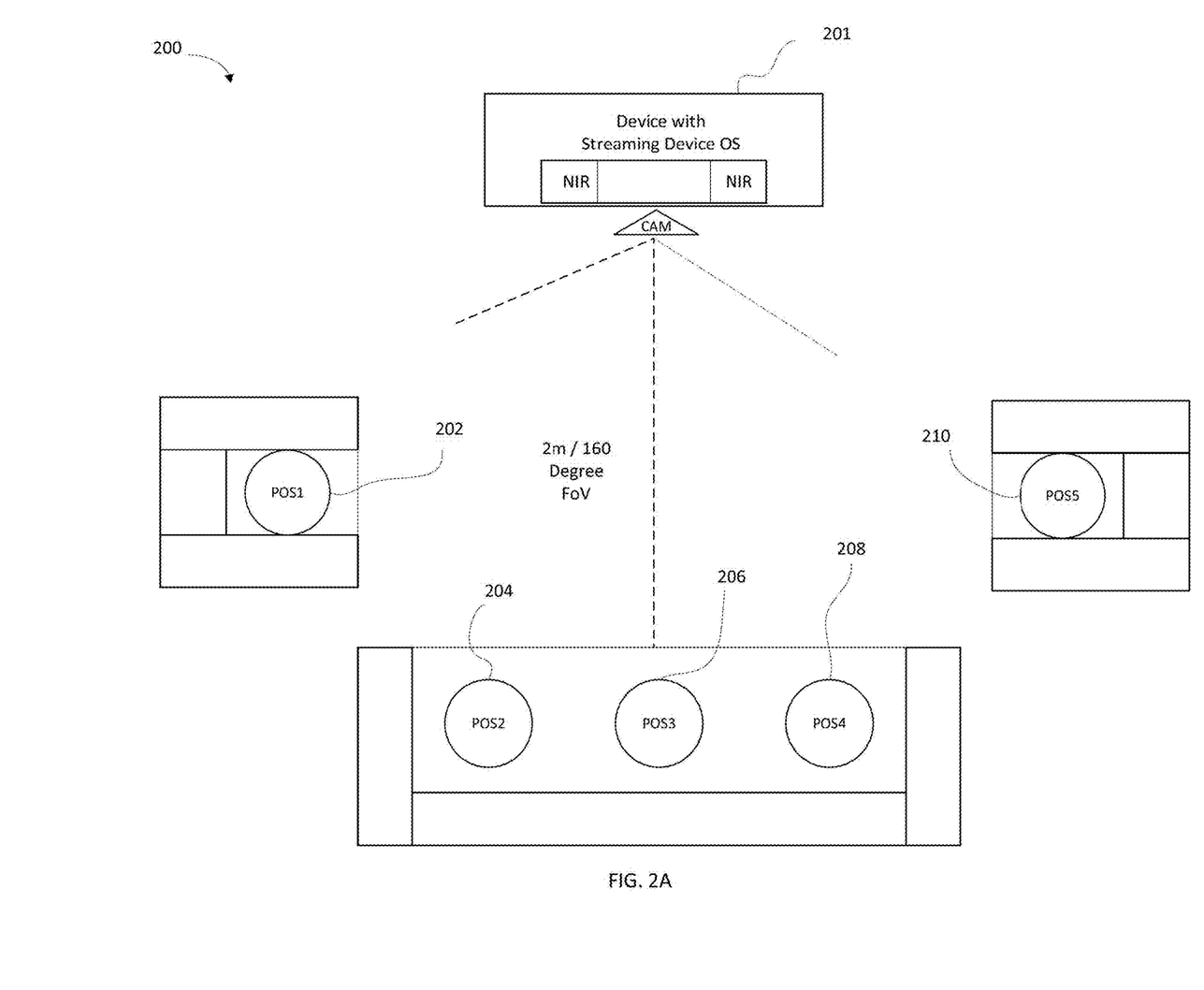
FIGS. 2A-2C are top views of example room layouts equipped with the automatic media control system according to aspects of the disclosure.

Referring to FIG. 2A, an example room layout 200 equipped with an automatic media control system 201 is depicted. Automatic media control system 201 includes a device with streaming device OS, near-infrared light emitter, and camera. Room layout 200 includes five users as each positioned in position1 202, position2 204, position3 206, position4 208, and position5 210. The camera attached to automatic media control system 202 may capture images of the users within a field of view (FOV) covering the area with 2 m in distance and 160 degrees from the center of the camera. Automatic media control system 201 may include dual RGB/NIR cameras. The dual RGB/NIR cameras may be used to accurately monitor the users each positioned in positions 202-210 when the levels of brightness illuminating the FOV change as the scenes of the media content being played constantly change. When the illumination level becomes low, automatic media control system 201 may use the NIR camera to monitor each position. Automatic media control system 201 may automatically switch to the RGB camera when the illumination level reaches a preconfigured threshold. Automatic media control system 201 may switch again to the NIR camera when the illumination level drops below the preconfigured threshold.

Figure 2B:
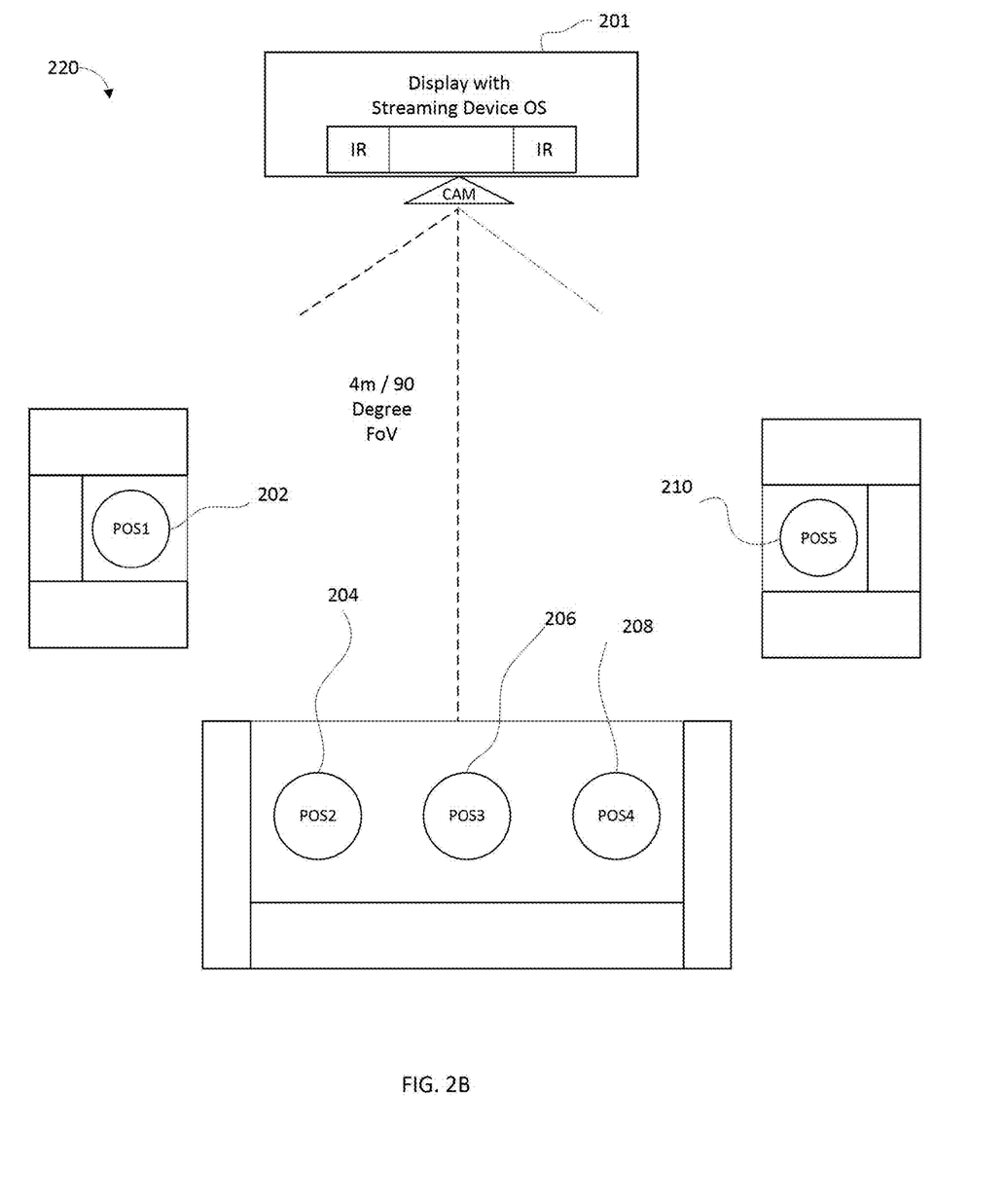

Referring to FIG. 2B, automatic media control system 201 may have a field of view covering the area of 4 m and 90 degrees from the center of the camera. According to some examples, automatic media control system 201 may be pre-programmed with the ideal distance between the users' positions and the device. For example, automatic media control system 201 may be pre-configured to determine the maximum distance from the screen of the device to the user's position based on the varying screen sizes of the device.

Figure 2C:
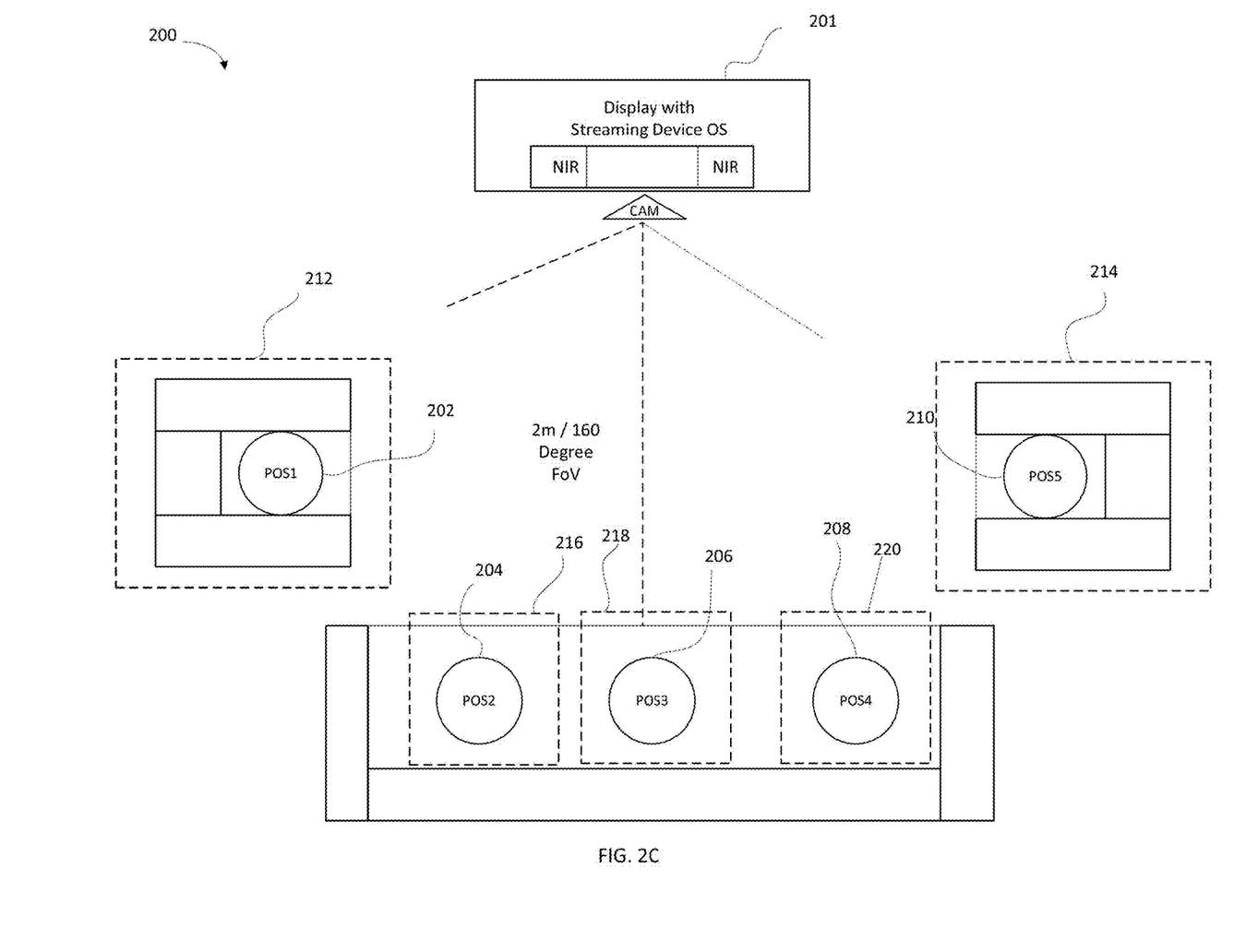

Referring to FIG. 2C, automatic media control system 201 may monitor monitoring zones, 212, 214, 216, 218, and 220. For example, monitoring zone 212 may be assigned to monitor activities occurring at position1 202. Similarly, monitoring zone 216 may be assigned to position2 204. Monitoring zone 218 may be assigned to position3 206. Monitoring zone 220 may be assigned to position4 208 and monitoring zone 214 may be assigned to position 5 210. Automatic media control system 201 may track and automatically update each monitoring zone based on the change in the position of each user in each position 1-5. For example, if a user from position 1 203 moves outside monitoring zone 212 and sits on the floor near monitoring zone 212 for a predefined threshold time, automatic media control system 201 may create a new monitoring zone for the user. In some examples, this newly created zone may be stored in memory as a new zone to replace the previous monitoring zone. In some other examples, the newly created zone may be added as an additional monitoring zone only for the duration of the current media content being played. In some other examples, the newly created zone may be added to the existing monitoring zones until a power cycle is carried out.

In other examples, if a user from position 1 203 moves outside monitoring zone 212 and the field of view of the camera attached to the automatic media control system 201, the automatic media control system 201 may stop monitoring the user's monitoring zone.

In some examples, a general zone may be defined by the automatic media control system 201. For example, the automatic media control system 201 may generate a general zone based on the location of the majority of viewers when the automatic media control system begins to play the media content. General zones may include sofa area, dining area, etc.

In some examples, the originally defined general zone may be modified. For example, if the users in position 2 204, position 3 206, and position 4 208 moves to a dining table located behind the monitoring zones 216-220 and stay at the dining table for a duration of preconfigured time, the automatic media control system 201 may update the monitoring zones 216-220 to respective positions at the dining table and modify the general zone to the dining area. Once the general zone is changed to a different area, the automatic media control system 201 may stop monitoring the positions of the users who did not move to the dining area.

In some examples, each monitoring zone may be stored at the start of the media content when each user pays attention to the media content without moving away from their initial location for a predefined length of time. In some examples, automatic media control system 201 may distinguish each user from other users sitting right next to each other or lying on each on a sofa and assign individual monitoring zones for each user. Automatic media control system 201 may monitor each user using a facial recognition technique. All users may be automatically enrolled at the beginning of the media content. Once each user's facial information is enrolled into automatic media control system 201, automatic control system 201 may use the facial recognition technique to distinguish one user from another and assign distinct monitoring zones to each user even when one user is located very close to another user, or the user is lying on another user on a sofa. In some other examples, automatic media control system 201 may use the NIR camera and thermal imaging techniques to distinguish one user from another. For example, even if the users' faces are not enrolled into automatic media control system 201, the NIR camera may monitor the thermal images of each user to assign distinct monitoring zones. As users move to different locations, the individual monitoring zones may be automatically updated. For example, if a given user changes seats to a new position within a room, a new monitoring zone may be established for the given user in the new position and the monitoring zone for the given user's previous position may be deleted. Accordingly, the gaze of multiple viewers can be continually monitored regardless of whether the viewers remain in the same position or change positions.

According to some examples, the automatic media control system 201 may vary lighting conditions sing the near-infrared light emitter. For example, the device may display and regularly change the ambient lighting and color of the room based on what is being displayed on the screen. Automatic media control system 201 may adjust the lighting of the room using the near-infrared light emitter. Automatic media control system 201 may differentiate a user sitting in position2 204 from another user sitting in position3 206 using a facial recognition technique even if the distance between position2 204 and position3 206 is minimal.

According to some examples, automatic media control system 201 may determine an optimal lighting solution based on the varying distance between the device and the positions of the users. The near-infrared light emitter may be capable of illuminating subjects. Also, during periods of increased ambient brightness by the display of the device screen, automatic media control system 201 may be configured to monitor the users more frequently. During darker ambient brightness, automatic media control system 201 may delay monitoring of the users up to a certain length of time while waiting for increased brightness. In some examples, automatic media control system 201 may obtain a confidence score of each user's gaze or drowsiness level and adjust the frequencies of a pause/rewind action accordingly. The monitoring of the users may be constant, or the detections of the users' attentiveness may be regularly polled over a period of time to enhance the confidence level.

Figure 3:
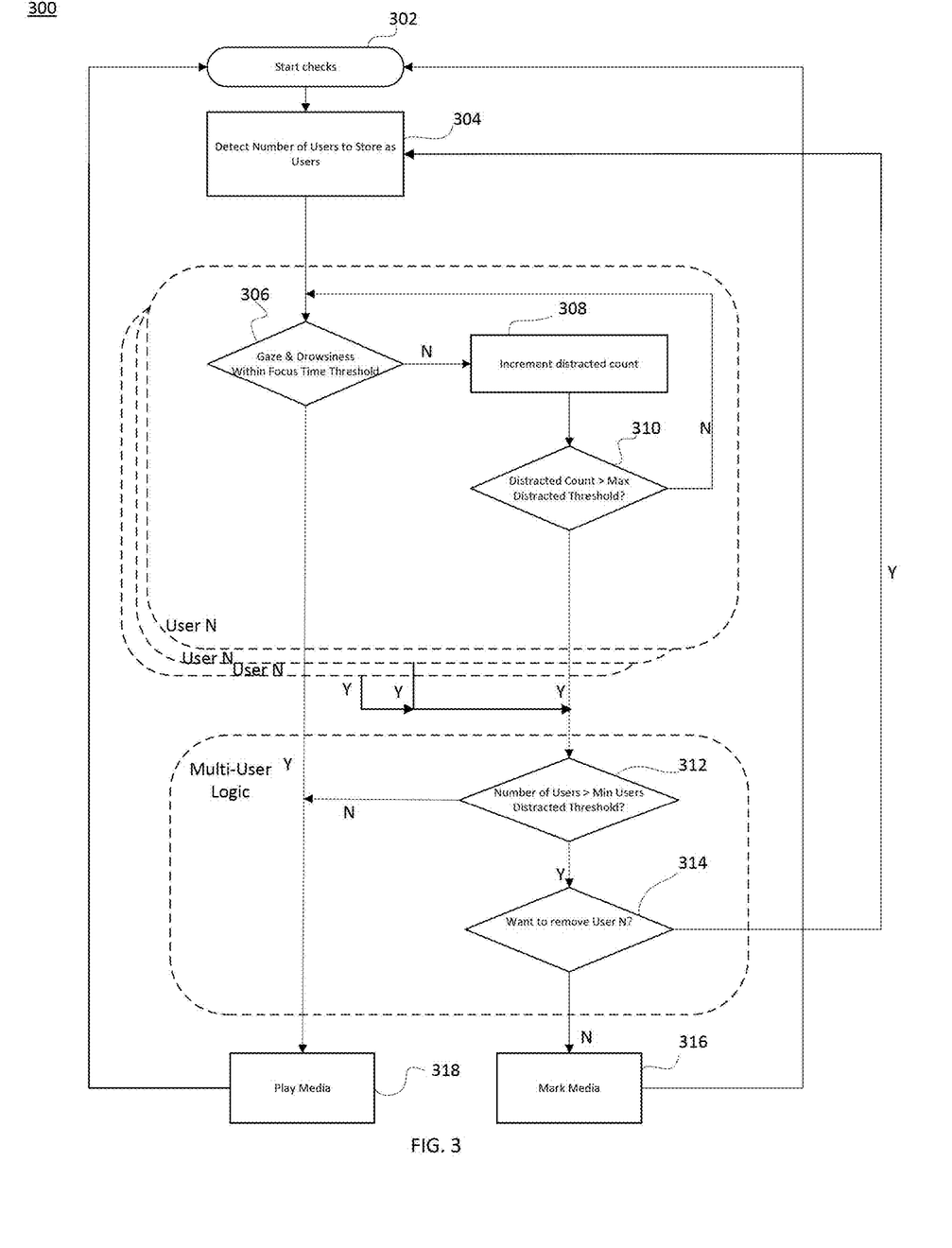
FIG. 3 depicts a flow diagram of an example method for automatic media control based on viewer attention according to aspects of the disclosure.

Referring to FIG. 3, a flow diagram of an example method for automatic media control is depicted. According to block 302, the automatic media control system may start displaying media content and trigger the camera attached to the automatic control system to capture potential users in a given space. According to block 304, the number of users to store as viewing users may be determined. For example, the automatic media control system may, based on the captured images of the potential users in a device viewing environment such as a living room, determine who is ready to watch the media content. The automatic media control system may determine that a user is ready to begin watching the media content as the user is sitting on a sofa located close to the media player (e.g., TV). On the other hand, the automatic media control system may determine that a user is not ready to begin viewing the media content and determine not to store the user as a viewing user if the user is positioned outside the zone that the automatic media control system can monitor.

According to block 306, the gaze and drowsiness of each user may be determined and compared against a predetermined focus time threshold. For example, if a user looks away from the display screen while viewing the media content, the automatic control system may count the action as a distracted gaze or drowsiness. The predetermined focus time threshold, for instance, may be set to 5 times within a 10 mins frame. If the user looks away from the display screen less than 5 times, the process proceeds to block 318 to continue to play the media content. When the media content ends, the automatic media control system may return to block 302 to start another media content. The predetermined focus time threshold may be an individualized predetermined focus time threshold for each individual viewer or an aggregated predetermined focus time threshold for a group of viewers. For example, the gaze and drowsiness of the first viewer may be determined based on a predetermined focus time threshold of 5 times within a 10 mins frame and the gaze and drowsiness of the second viewer may be determined based on a predetermined focus time threshold set to 10 times within a 10 mins frame. In such examples, a responsive action can be taken when one or more of the individual viewers meets the predetermined threshold. In some examples, a responsive action may be taken when all of the viewers meet the predetermined threshold. In other examples, the automatic media system may determine the gaze and drowsiness of a group of viewers based on an identical focus threshold of 10 times within a 10 mins frame. In some examples, the automatic media system may utilize a machine learning model to determine whether to apply an individual predetermined focus time threshold or an aggregated predetermined focus time threshold.

If the user looks away from the display screen more than 5 times, the automatic media control system may proceed to block 308 to increment the distracted count for each user. Each time the distracted count is incremented, at block 310, the distracted count may be compared against the maximum distracted threshold to determine if the user's cumulative distracted count exceeds the maximum distracted threshold. If the distracted count exceeds the maximum distracted threshold, the process moves to block 312 to determine whether the total number of users whose distracted count exceeded the maximum distracted threshold exceeds the preconfigured minimum number of users exceeding the distracted threshold. If the distracted count of the user does not exceed the maximum distracted threshold at block 310, the process may return to 306 such that the automatic media control system continues monitoring the gaze direction and the drowsiness of the user.

According to block 312, if the number of users with a distracted count exceeding the maximum distracted thresholds exceeds the minimum users' distracted thresholds, the process moves to block 314 to determine whether or not to remove a user. There may be N number of users viewing the media content, and the automatic media control system may iterate the blocks 406-414 for each of N numbers of users. The automatic media control system may prompt other users to select an option to remove user A, for example, if user A is not paying attention or falling asleep while the media content is in play. If the other users select "no" (i.e. not removing user A), the automatic media control system may mark the spot in the media content at block 316 such that the media content may be rewound to the aforementioned spot when the user regains focus on the media content and the other users agree to rewind to the spot. If the option "yes" is selected, user A may be removed from the monitoring process at block 304. When the media content is paused at block 316, the automatic media control system may return to block 302 to check the status of other users.

Figure 4:
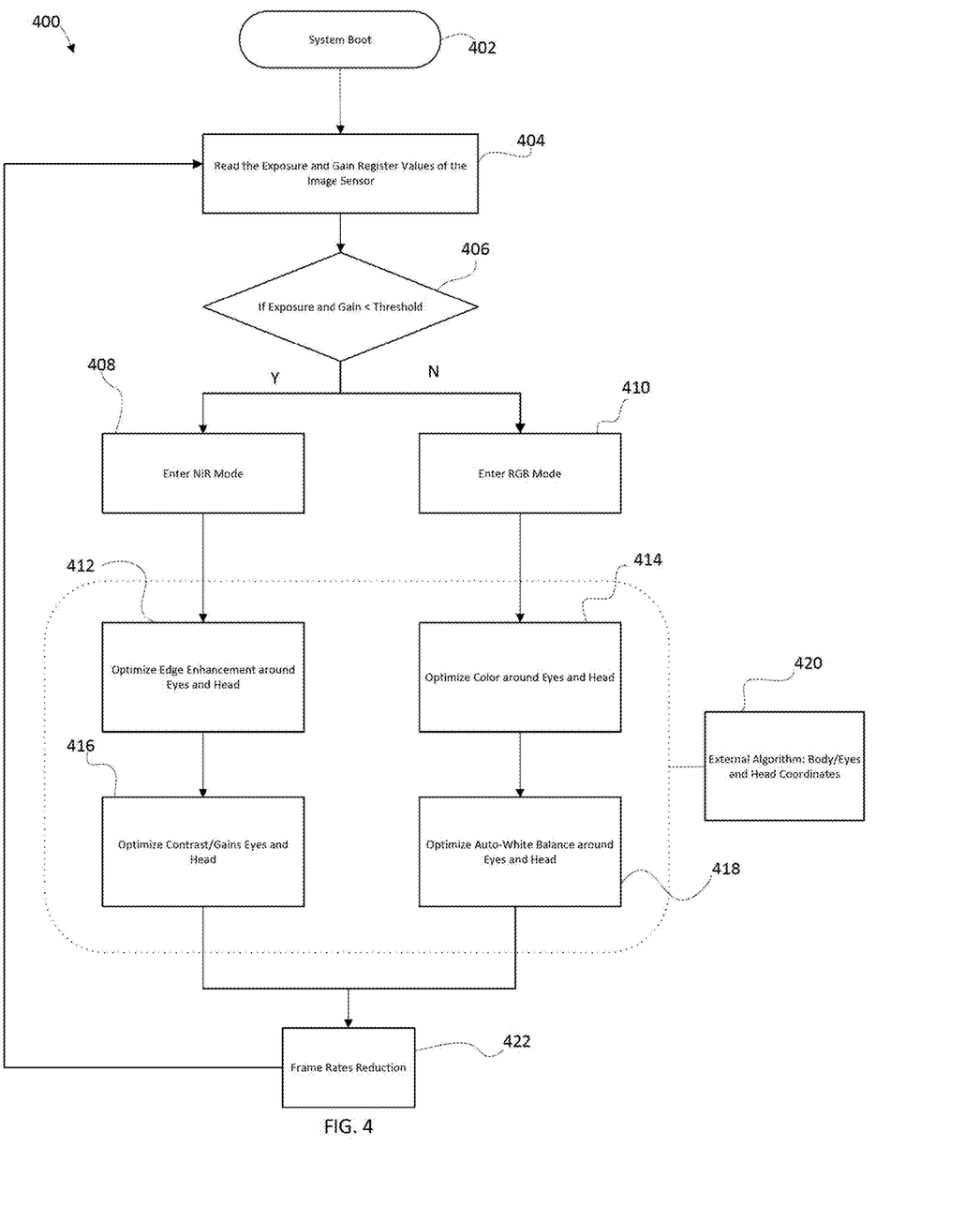
FIG. 4 depicts a flow diagram of an example method for switching between near-infrared (NIR) and red-green-blue (RGB) cameras using an automatic media control system according to aspects of the disclosure.

Referring to FIG. 4, a flow diagram of an example method for switching between near-infrared (NIR) and red-green-blue (RGB) cameras using an automatic media control system is depicted. According to block 402, the automatic media control system boots and starts the camera system. According to block 404, the exposure and gain register value of the image sensor such as image sensor 110 as illustrated in FIG. 1A may be checked by a processor embedded in the system such as a processor embedded in SoC 114 as illustrated in FIG. 1A.

According to block 406, the automatic media control system may determine if the exposure and gain register values are within a preconfigured threshold. According to some examples, the preconfigured threshold may be adjusted by the automatic media control system according to the brightness or darkness level of the room where the users are viewing the media content. If the exposure and gain register values are less than the preconfigured threshold, the automatic media control system may enter the near-infrared (NIR) mode at block 408.

According to block 412, the automatic media control system may optimize the edge enhancement around users' eyes and head regions. In the NIR mode, the edges may be enhanced to be able to detect the features or landmarks of each user's face clearer. According to some examples, the automatic media control system may analyze the gaze direction and drowsiness of each user only using the edges of the features of the head and/or eye regions of the user.

According to block 416, the enhanced edges of the features may be processed to optimize the contrast and gains around the above features or the landmarks of each user's face (e.g., eyes and head). The optimized features may be used to reduce the frame rates of the captured images of each user at block 422. The frame rates may be reduced since using the optimized features may provide better quality images for analysis of the gaze and drowsiness of each user, thereby requiring less amount of image information for the given analysis. In some examples, frame rates may be reduced to enable the camera in the NIR mode to allow more light to enter the lens and get more information.

According to block 406 again, if the exposure and gain register values exceed the preconfigured threshold, the process may proceed to block 410 to enter red-green-blue (RGB) mode. According to block 414, the color around the eyes and head regions of each user may be optimized. For example, the colors may be optimized to differentiate between the eyes and eyelids.

According to block 418, auto-white balance around the eyes and head regions of each user may be optimized. Auto white balance may be controlled more closely around the head or eye regions. In some examples, the auto-white balance may be used to limit the lightning around the eye regions to prevent false positives. For example, if excessive light is entered to capture the image information of the eye region, the areas dividing the eyes and eyelids areas may become blurry, and thus the probability of false positiveness may increase. The optimized images of eyes and head regions may be used to reduce the frame rates at block 422.

According to block 420, external algorithms for detecting body, eyes, and head coordinates may be injected into blocks 412-318 to aid the optimization processes. Such external algorithms may be obtained from external sources and stored in memory such as memory 118 as illustrated in FIG. 1A.

Figure 5:
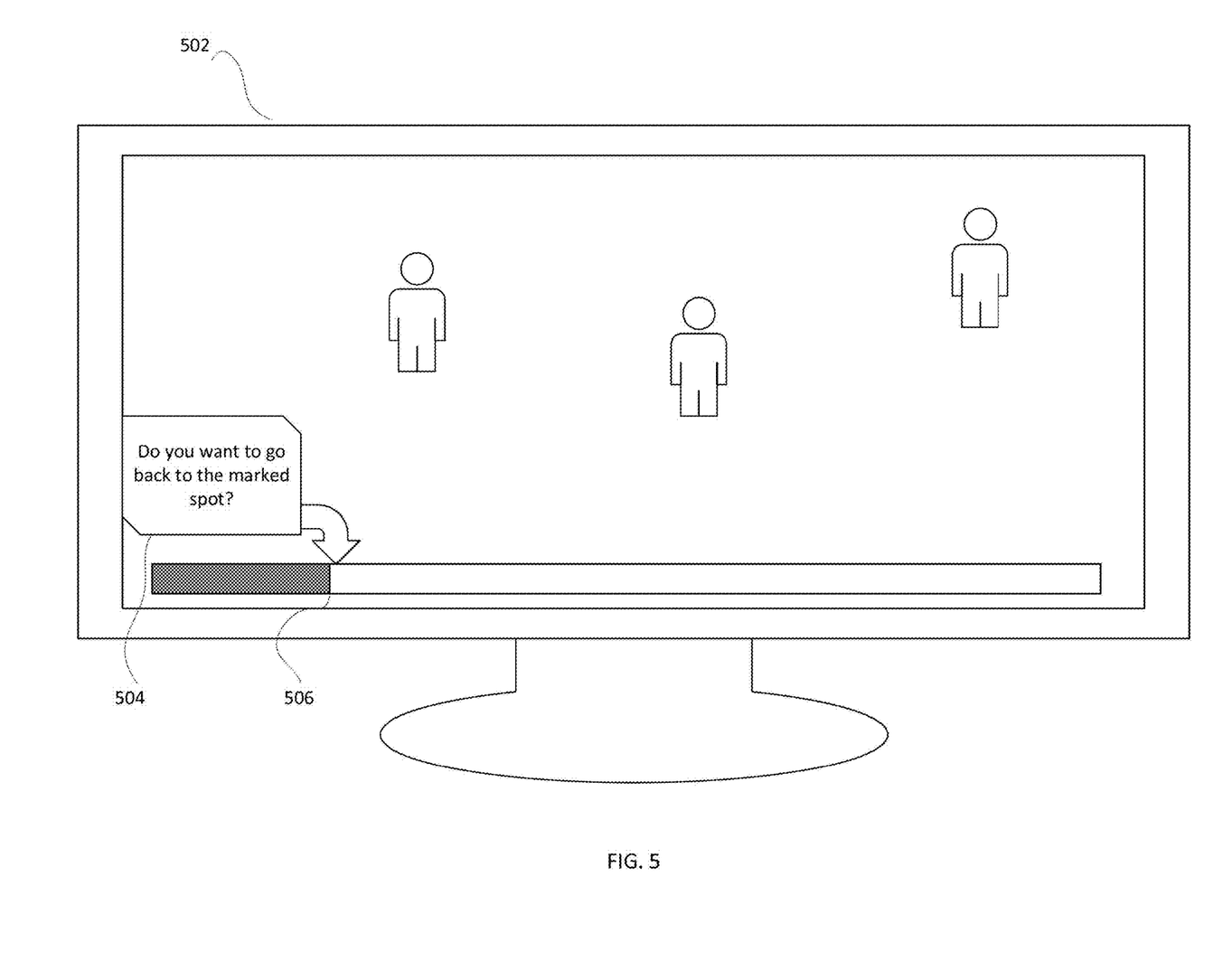
FIG. 5 illustrates a display screen with a notification prompting a user to rewind media content when the user's attention level decreases according to aspects of the disclosure.

FIG. 5 illustrates a device screen with a notification that shows the playback bar and the spot marked where the user lost attention. Device screen 502 may provide a pop-up message 504 stating "Do you want to go back to the marked spot" pointing to the marked spot on the playback bar 506 when a user's attention level drops below a preconfigured threshold.

Figure 6:
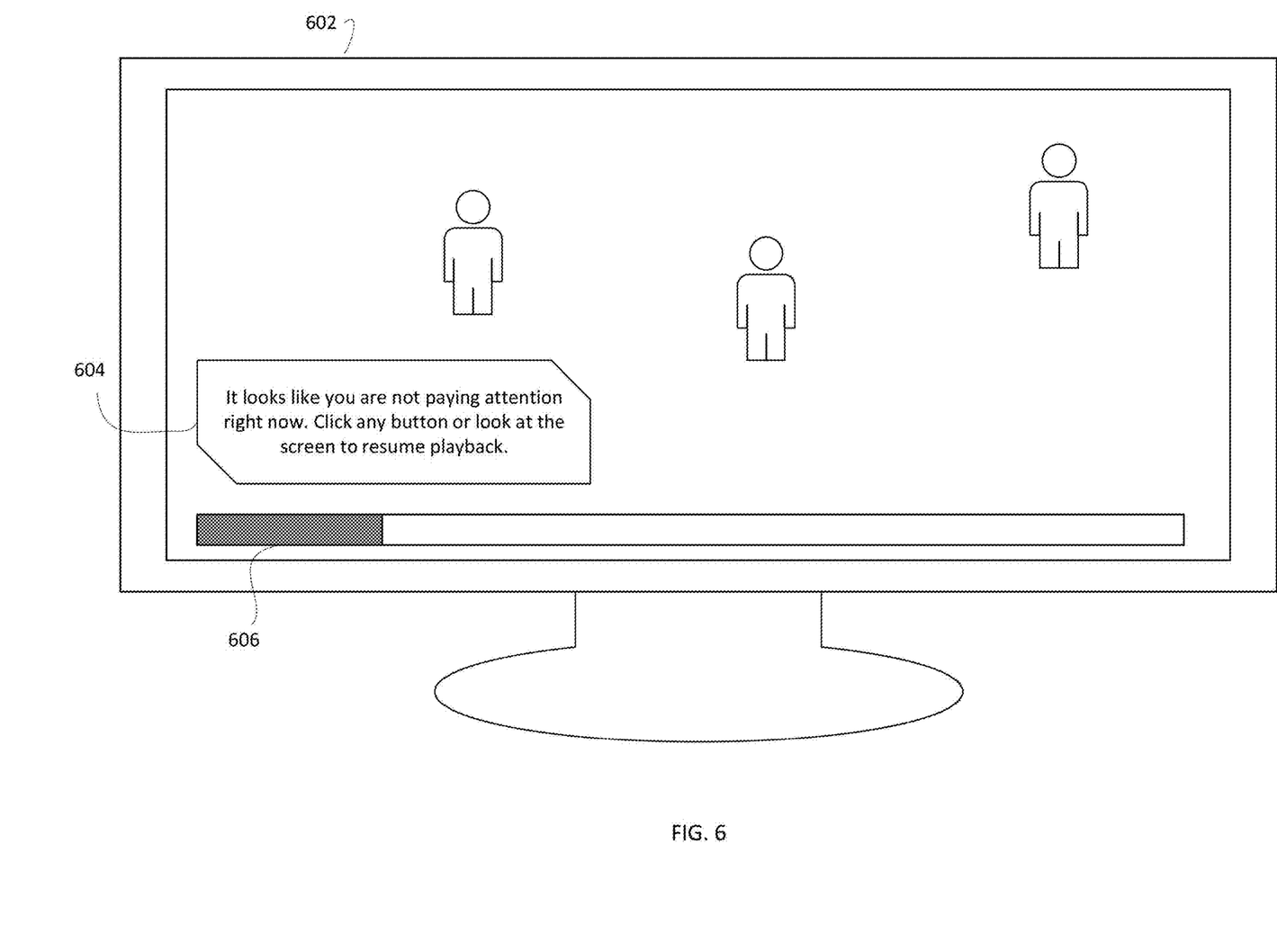
FIG. 6 illustrates a display screen with a notification prompting a group of users to playback media content according to aspects of the disclosure.

According to some examples, the system may provide a pop-up notification when a group of users no longer pay attention to the device screen. For example, as illustrated in FIG. 6, device screen 602 may provide a pop-up notification stating "It looks like you are not paying attention right now. Click any button or look at the screen to resume playback from the playback bar 606".

Figure 7:
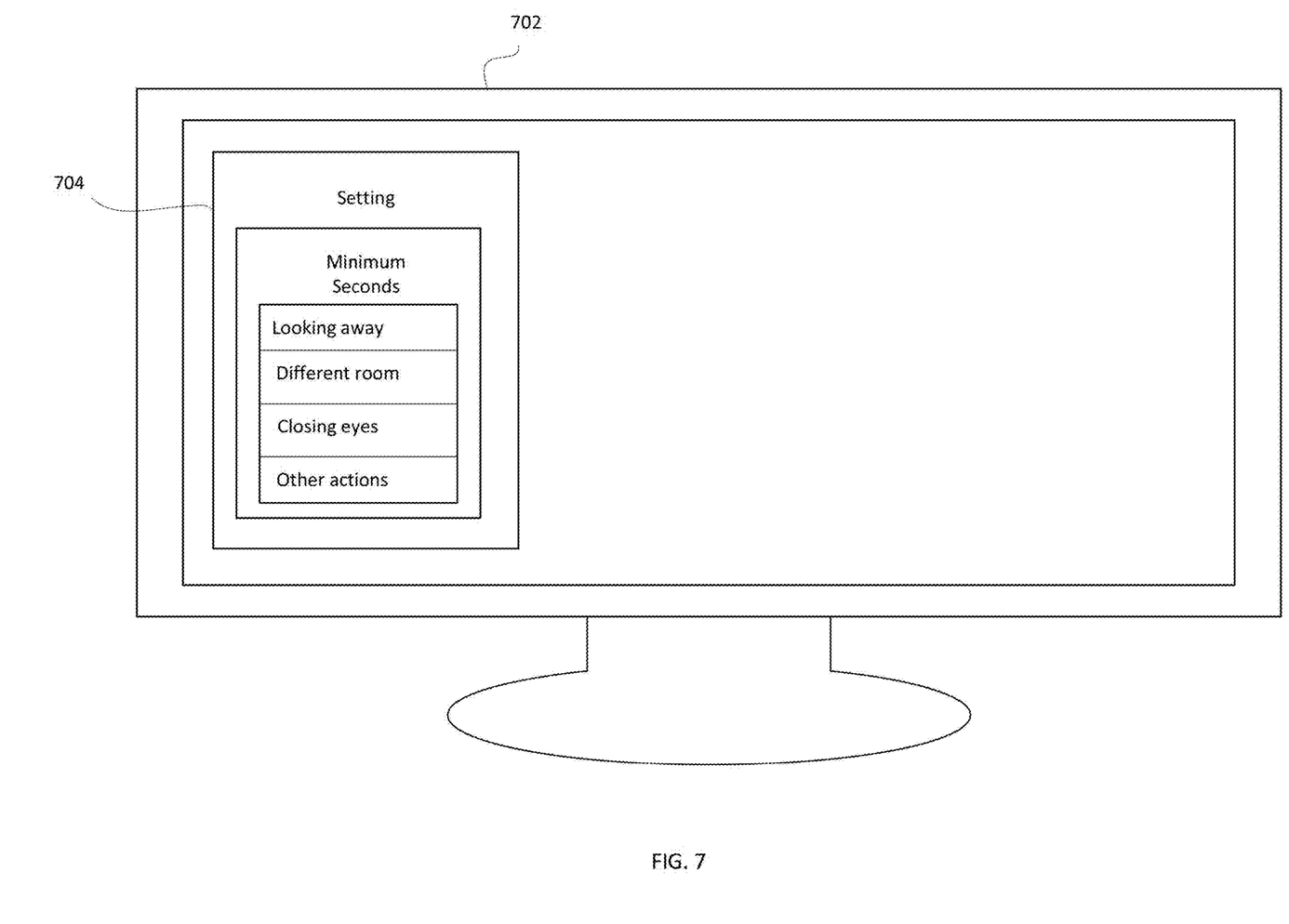
FIG. 7 illustrates a user interface enabling a threshold selection for various motions of a user according to aspects of the disclosure.

FIG. 7 illustrates a user interface where a user may select threshold seconds for various motions that may trigger the stopping of the media content. Device screen 702 provides a pop-up "setting "window 704. A user may manually select or adjust the thresholds (e.g., minimum seconds) for each motion such as looking away, being in a different room, closing eyes or other actions including scrolling on a smartphone.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification, the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

Although the technology herein has been described with reference to particular examples, it is to be understood that these examples are merely illustrative of the principles and applications of the present technology. It is therefore to be understood that numerous modifications may be made and that other arrangements may be devised without departing from the spirit and scope of the present technology as defined by the appended claims.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A system for automatic media control based on a user's attention level, the system comprising:
   one or more processors;
   memory in communication with the one or more processors, wherein the memory contains instructions configured to cause the one or more processors to:
   detect a plurality of viewers of a media content;
   determine a plurality of monitoring zones for the plurality of viewers within a room;
   detect an activity within one or more of the plurality of monitoring zones within the room;
   determine, based on the detected activity within the one or more of the plurality of monitoring zones, an attention level of a respective viewer in the one or more of the plurality of monitoring zones;
   determine whether the attention level is below a preconfigured threshold attention level; and
   mark the media content in response to the attention level being below the preconfigured threshold attention level, the marked media content representing a spot where the attention level drops below the preconfigured threshold attention level.

2. The system of claim 1, wherein the instructions are further configured to cause the one or more processors to save facial recognition information for each of the plurality of viewers.

3. The system of claim 1, wherein the monitoring zones are updated when at least one viewer moves from a first position to a second position.

4. The system of claim 1, wherein the instructions are further configured to cause the one or more processors to determine a total number of viewers whose attention level is less than the preconfigured threshold attention level.

5. The system of claim 4, wherein the instructions are further configured to cause the one or more processors to compare the total number of the viewers whose attention level exceeds the preconfigured threshold attention level with a preconfigured threshold number of users.

6. The system of claim 5, wherein in response to the total number of the viewers whose attention level exceeding the preconfigured threshold attention level, the instructions are further configured to cause the one or more processors to display an option to remove a status of one or more of the viewers.

7. The system of claim 1, wherein the instructions are further configured to cause the one or more processors to rewind the media content to a point where attention levels of one or more of the plurality of viewers were below a preconfigured threshold attention level.

8. The system of claim 1, further comprising:
   a camera comprising a near-infrared (NIR) camera and a color (RGB) camera.

9. The system of claim 8, wherein the camera automatically switches between the NIR and RGB cameras based on detecting brightness of a room where the plurality of viewers are viewing the media content.

10. The system of claim 1, wherein the preconfigured threshold attention level is an individual preconfigured threshold attention level.

11. The system of claim 1, wherein the preconfigured threshold attention level is a group preconfigured threshold attention level.

12. A method for automatically controlling media based on a user's attention level, the method comprising:
   detecting a plurality of viewers of a media content;
   determining a plurality of monitoring zones for the plurality of viewers within a room;
   detecting an activity within one or more of the plurality of monitoring zones within the room;
   determining, based on the detected activity within the one or more of the plurality of monitoring zones, an attention level of a respective viewer in the one or more of the plurality of monitoring zones;
   determining whether the attention level is below a preconfigured threshold attention level; and
   marking the media content in response to the attention level being below the preconfigured threshold attention level, the marked media content representing a spot where the attention level drops below the preconfigured threshold attention level.

13. The method of claim 12, further comprising saving facial recognition information for each of the plurality of viewers.

14. The method of claim 12, wherein the monitoring zones are updated when the at least one viewer moves from a first position to a second position.

15. The method of claim 12, further comprising:
determining a total number of the plurality of viewers whose attention level is less than the preconfigured threshold attention level.

16. The method of claim 15, further comprising:
comparing the total number of the plurality of viewers whose attention level exceeds the preconfigured threshold attention level with a preconfigured threshold number of users.

17. The method of claim 16, further comprising:
in response to the total number of the plurality of viewers whose attention level exceeding the preconfigured threshold attention level, displaying an option to remove a status of one or more of the plurality of viewers.

18. The method of claim 12, further comprising rewinding the media content to a point where attention levels of one or more of the plurality of viewers were below a preconfigured threshold attention level.

19. The method of claim 12, wherein the determining the viewers as viewing users of the media content utilizes a camera comprising a near-infrared (NIR) camera and a color (RGB) camera.

20. A non-transitory machine-readable medium comprising machine-readable instructions encoded thereon for performing a method of automatically controlling media based on a user's attention level, the method comprising:
detecting a plurality of viewers of a media content;
determining a plurality of monitoring zones for the plurality of viewers within a room;
detecting activity within each of the plurality of monitoring zones within the room;
determining, based on the detected activity within each of the plurality of monitoring zones, an attention level for each viewer of the plurality of viewers;
determining whether the attention level is below a preconfigured threshold attention level; and
marking the media content in response to the attention level being below the preconfigured threshold attention level, the marked media content representing a spot where the attention level drops below the preconfigured threshold attention level.

* * * * *